United States Patent
Mayes

(10) Patent No.: US 11,062,013 B2
(45) Date of Patent: Jul. 13, 2021

(54) TWO-STEP HARDWARE AUTHENTICATION

(71) Applicant: Bently Nevada, LLC, Minden, NV (US)

(72) Inventor: Nathan Dean Mayes, Minden, NV (US)

(73) Assignee: BENTLY NEVADA, LLC, Minden, NV (US)

( * ) Notice: Subject to any disclaimer, the term of this patent is extended or adjusted under 35 U.S.C. 154(b) by 461 days.

(21) Appl. No.: 15/910,589

(22) Filed: Mar. 2, 2018

(65) Prior Publication Data

US 2019/0272366 A1 Sep. 5, 2019

(51) Int. Cl.
*G06F 21/35* (2013.01)
*G06F 21/40* (2013.01)

(52) U.S. Cl.
CPC .............. *G06F 21/35* (2013.01); *G06F 21/40* (2013.01); *G06F 2221/2113* (2013.01); *G06F 2221/2141* (2013.01); *G06F 2221/2153* (2013.01)

(58) Field of Classification Search
CPC .. G06F 21/35; G06F 21/40; G06F 2221/2113; G06F 2221/2141; G06F 2221/2153
USPC .......................................................... 726/7
See application file for complete search history.

(56) References Cited

U.S. PATENT DOCUMENTS

| | | | | |
|---|---|---|---|---|
| 7,506,819 B2* | 3/2009 | Beenau | ............... | G06Q 20/20 235/487 |
| 9,692,879 B1* | 6/2017 | Lack | ............... | H04M 1/72577 |
| 2006/0282552 A1* | 12/2006 | Bhesania | ............ | G06F 11/3055 710/8 |
| 2007/0271596 A1* | 11/2007 | Boubion | ................. | G06F 21/35 726/3 |
| 2010/0005518 A1* | 1/2010 | Tirpak | .................. | H04L 67/306 726/6 |
| 2011/0035338 A1* | 2/2011 | Kagan | .................... | G01D 4/002 705/412 |
| 2011/0035604 A1* | 2/2011 | Habraken | ............... | G06F 21/34 713/193 |
| 2014/0143149 A1* | 5/2014 | Aissi | ....................... | G06F 21/31 705/44 |
| 2015/0070507 A1* | 3/2015 | Kagan | .................... | G01D 4/002 348/160 |

(Continued)

*Primary Examiner* — Dereena T Cattungal
(74) *Attorney, Agent, or Firm* — Mintz Levin Cohn Ferris Glovsky and Popeo, PC; Lisa Adams

(57) ABSTRACT

Methods and systems are provided for two-step hardware authentication for machine monitoring systems. In one embodiment, a machine monitoring system can include a first hardware lock having a locked-state and an unlocked-state. The monitoring system can also include a second hardware lock including a sensor to detect first identification indicia of a user. The machine monitoring system can further include a data port configured to operatively couple to a computing device of the user. The data port can have an enable state and a disable state. The monitoring machine can include a processor operatively coupled to the first hardware lock, the second hardware lock, and the data port. The processor can be configured to receive data characterizing the activation of the first hardware lock and the first identification indicia of the user, and activate the data port to the computing device of the user.

18 Claims, 5 Drawing Sheets

(56) References Cited

U.S. PATENT DOCUMENTS

2016/0210446 A1* 7/2016 Hamlin ................ G06F 21/316
2017/0069148 A1* 3/2017 Gilbertson ............ G06F 21/32

* cited by examiner

TWO-STEP HARDWARE AUTHENTICATION

BACKGROUND

Manually monitoring complex machines that have several moving and/or vibrating parts (e.g., turbines, compressors, etc.) can be difficult. Monitoring systems are commonly used to monitor the operation of a complex machine, and generate alarms when the machine is not operating as desired. Monitoring systems can include sensors to detect operational information (e.g., operating parameters, operational states, etc.) associated with the machine, and relay a signal to a computing device, which can generate alarms based on the operational information.

Alarms can be generated by comparing the operation information with one or more alarm set point values, which can be uniquely configured for the different operational states of a machine. For example, alarms can be generated when an operational parameter of a machine exceeds an alarm set point value or is less than an alarm set point value. In some cases, generation of an alarm can alter the operation of the machine (e.g., shut the machine down). Alarm set point values can play an important role in determining the operation of the machine because the generation of the alarm is based on the corresponding set point values.

Alarm set point values of an alarm may need to be changed, for example, based on the age of the machine. But, in order to ensure that unauthorized users do not change the alarm set point values, access to alarm set point values may need to be regulated.

SUMMARY

In general, apparatus, systems, methods and articles of manufacture for two-step hardware authentication for machine monitoring systems are provided.

In one embodiment, a machine monitoring system can include a first hardware lock having a locked-state and an unlocked-state. The first hardware lock can be configured to be activated from the locked-state to the unlocked-state by a key. The monitoring system can also include a second hardware lock including a sensor configured to detect a first identification indicia of a user. The machine monitoring system can further include a data port configured to operatively couple to a computing device of the user. The data port can have an enable state and a disable state. The monitoring machine can include a processor operatively coupled to the first hardware lock, the second hardware lock, and the data port. The processor can be configured to receive data characterizing the activation of the first hardware lock, and receive data characterizing the first identification indicia of the user. The processor can also be configured to activate the data port from the disable state to the enable state to operatively couple to the computing device of the user. The processor can also be configured to determine a user access level based on the first identification indicia and a database of authorized users. The user access level can be indicative of a privilege assigned to the user to access (e.g., query, edit, and the like) a first alarm set point value of a machine (e.g., industrial machine). The processor can further be configured to receive a user input for the first alarm set point value of the machine from the computing device of the user.

One or more of the following features can be included in any feasible combination.

In one embodiment, a machine monitoring system can include a first hardware lock having a locked-state and an unlocked-state. The first hardware lock can be configured to be activated from the locked-state to the unlocked-state by a key. The monitoring system can also include a second hardware lock including a sensor configured to detect a first identification indicia of a user. The machine monitoring system can further include a data port configured to operatively couple to a computing device of the user. The data port can have an enable state and a disable state. The monitoring machine can include a processor operatively coupled to the first hardware lock, the second hardware lock, and the data port. The processor can be configured to receive data characterizing the activation of the first hardware lock, and receive data characterizing the first identification indicia of the user. The process can also be configured to activate the data port from the disable state to the enable state to operatively couple to the computing device of the user. The processor can also be configured to determine a user access level based on the first identification indicia and a database of authorized users. The user access level can be indicative of a privilege assigned to the user to access (e.g., query, edit, and the like) a first alarm set point value of a machine. The processor can further be configured to receive a user input for the first alarm set point value of the machine from the computing device of the user.

In one embodiment, the machine monitoring system can include a monitor card associated with the machine. The monitor card can include a monitor card memory that stores the first alarm set point value. The machine monitoring system can also include a configuration card that can include the first hardware lock, the second hardware lock, the data port, the processor and a configuration card memory. The configuration card memory stores the database of authorized users. The processor can be operatively coupled to the monitor card and configured to execute a database operation on the first alarm set point value based on the user input.

In one embodiment, the processor can be configured to activate the data port from the disable state to the enable state by verifying the first identification indicia of the user. In another embodiment, the verification of the first identification indicia includes identifying a user identification value indicative of the first identification indicia in the database of authorized users. In yet another embodiment, the processor can be further configured to receive a second identification indicia of the user from the computing device via the data port.

In one embodiment, the processor can be further configured to verify the second identification indicia of the user based on a user name value and a user password value associated with the user identification value in the database of authorized users. In another embodiment, the processor can be configured to determine the user access level based on the user identification value, the user name value and the user password value. In yet another embodiment, the user access level can be indicative of an authorized database operation associated with the user. The authorized database operation can include one of reading the first alarm set point value and/or editing the first alarm set point value in a monitor card memory of the machine.

In one embodiment, the processor can be further configured to execute the user input based on the determined access level. In another embodiment, the user identification value, the username value, the user password value and information associated with the user access level can be stored in a user dataset in the database of authorized users. In yet another embodiment, the information associated with the user access level can include indicia of one or more set point values accessible to the user, and one or more authorized database operations associated with each of the one or more set point values. In another embodiment, the sensor in the second hardware lock can be configured to detect the first identification indicia via one or more of RFID, Bluetooth, and keypad.

In one embodiment, a two-step hardware authentication method can include receiving data characterizing activation of a first hardware lock, and receiving data characterizing a first identification indicia of the user from a second hardware lock. The method can include activating a data port from a disable state to an enable state to operatively couple to a computing device of a user. The method can also include determining a user access level based on the first identification indicia and a database of authorized users. The user access level indicative of a privilege assigned to the user to access a first alarm set point value of an machine. The method can further include receiving a user input for the first alarm set point value of the machine from the computing device of the user. The method can also include executing a database operation on the first alarm set point value based on the user input.

In one embodiment, the method can include activating the data port from the disable state to the enable state by verifying the first identification indicia of the user. In another embodiment, verifying the first identification indicia can include identifying a user identification value indicative of the first identification indicia in the database of authorized users.

In one embodiment, the method can include receiving a second identification indicia of the user from the computing device via the data port. In another embodiment, the method can include verifying the second identification indicia of the user based on a user name value and a user password value associated with the user identification value. In yet another embodiment, determining the user access level can be based on the user identification value, the user name value and the user password value. The user access level can be indicative of an authorized database operation associated with the user. The authorized database operation can include one of reading the first alarm set point value and/or editing the first alarm set point value. In one embodiment, executing the database operation on the first alarm set point can include editing the first alarm set point value to a new value based on the user input.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Some industrial machine monitoring systems can generate alarms when a parameter, such as vibration, exceeds a threshold values (also referred to as a set point). These alarms can enable machine operators to identify machine problems early and take corrective actions. In addition, a given monitoring system can monitor multiple machines, and so can have many set points. But granting an individual access to the monitoring system to change a given set point can allow the individual to change any set point in the system, even those that the individual is not authorized to modify or should not modify.

To provide improved security, the current subject matter can include a two-step hardware authentication in which access to the set point values is permitted after a hardware lock in the monitoring system has been unlocked. This hardware lock can require a user to provide a unique identification via a sensor (e.g., an RFID reader, a keypad, and the like). Further, once the identity of the user is known, the current subject matter can limit access of the user to certain machines. The system can also limit the user to a type of operation (e.g., read access, write access, etc.). By including a user lock that requires user identity to unlock, the current subject matter can improve the security of the monitoring system.

Figure 1:
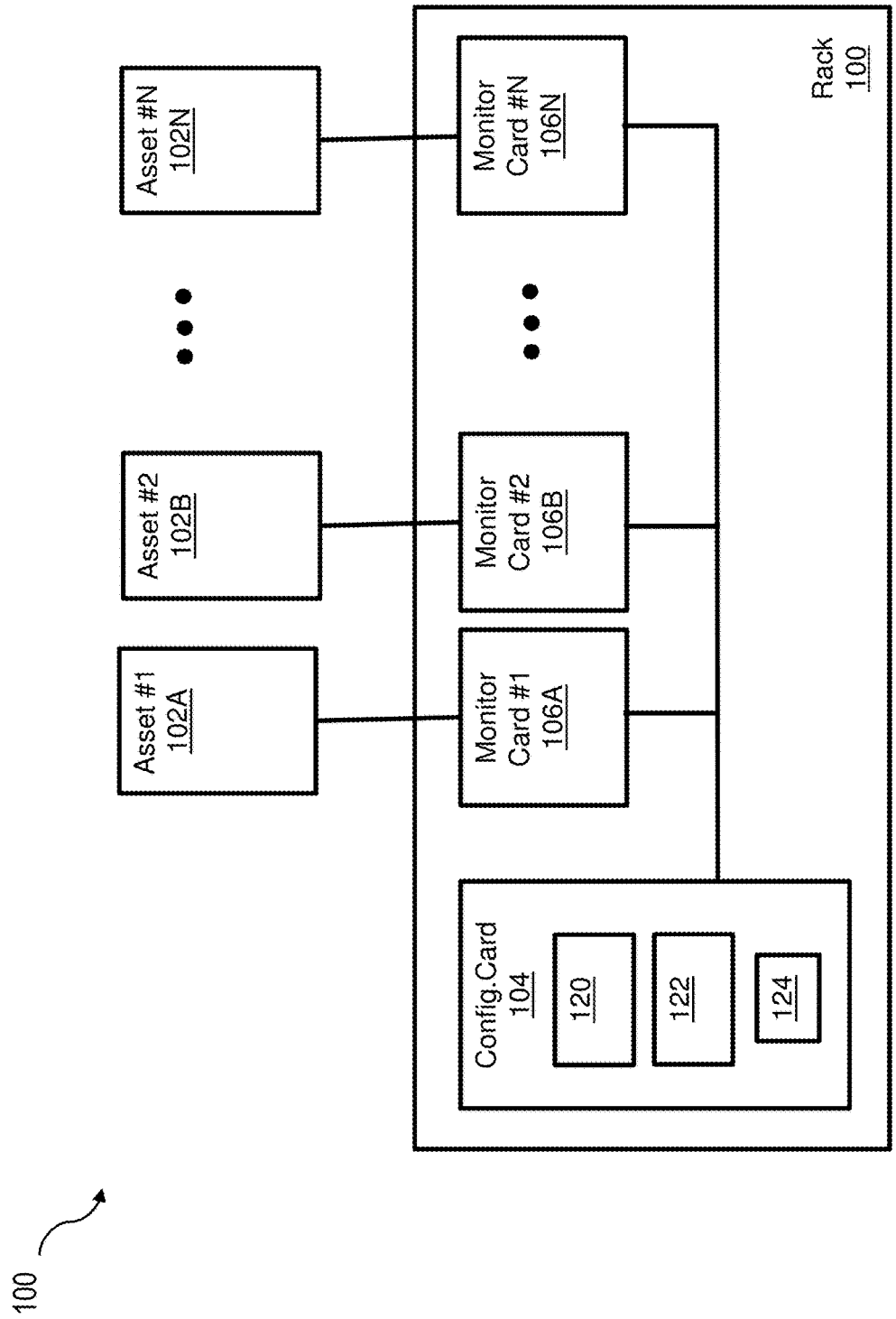
FIG. 1 is a system block diagram of an example machine monitoring system including an example two-step hardware authentication.

FIG. 1 is a system block diagram of an example machine (e.g., industrial machine) monitoring system 100. The monitoring system 100 can include an example two-step hardware authentication that can improve security of the monitoring system. The monitoring system 100 can control the operation of machines/assets 102A-N at an industrial plant (e.g., a power plant). For example, the monitoring system 100 can monitor the operation of the machines and generate alarms when a machine is not operating as desired. For example, an alarm can be generated when an operating parameter of the machine exceeds a set point value or falls below a set point value. The set point value can be queried (e.g., read, edited, etc.) only by the authorized users.

The monitoring system 100 can include a configuration card 104 and multiple monitor cards 106A-N that can communicate with the configuration card 104. Each monitor card can be operatively coupled to a machine (e.g., one of machines 102A-N). In some implementations, a monitor card 106A can include a processor for monitoring the operation of a machine 102A, and a memory card for storing the alarm set points associated with the machine 102A. The configuration card 104 can include a first hardware lock 120, a second hardware lock 122 and a data port 124. The configuration card 104 can receive inputs from a user (e.g., via the first hardware lock 120, the second hardware lock 122, the data port 124, and the like), and can access (e.g., read, edit, and the like) set point values in the monitor cards 106A-N.

The first hardware lock 120 can include, for example, a lock that can be switched from a locked state to an unlocked state by a key (e.g., physical key, passcode provided through a keypad lock). The second hardware lock can include a sensor that can detect a unique first identification indicia associated with a user. This can be done, for example, by radio-frequency identification (RFID), near field communication (NFC), Bluetooth, phone key, key fob and the like. In some implementations, the unique first identification indicia associated with the user can be acquired by a keypad in the second hardware lock. A user can enter in the first identification indicia via the keypad.

Figure 2:
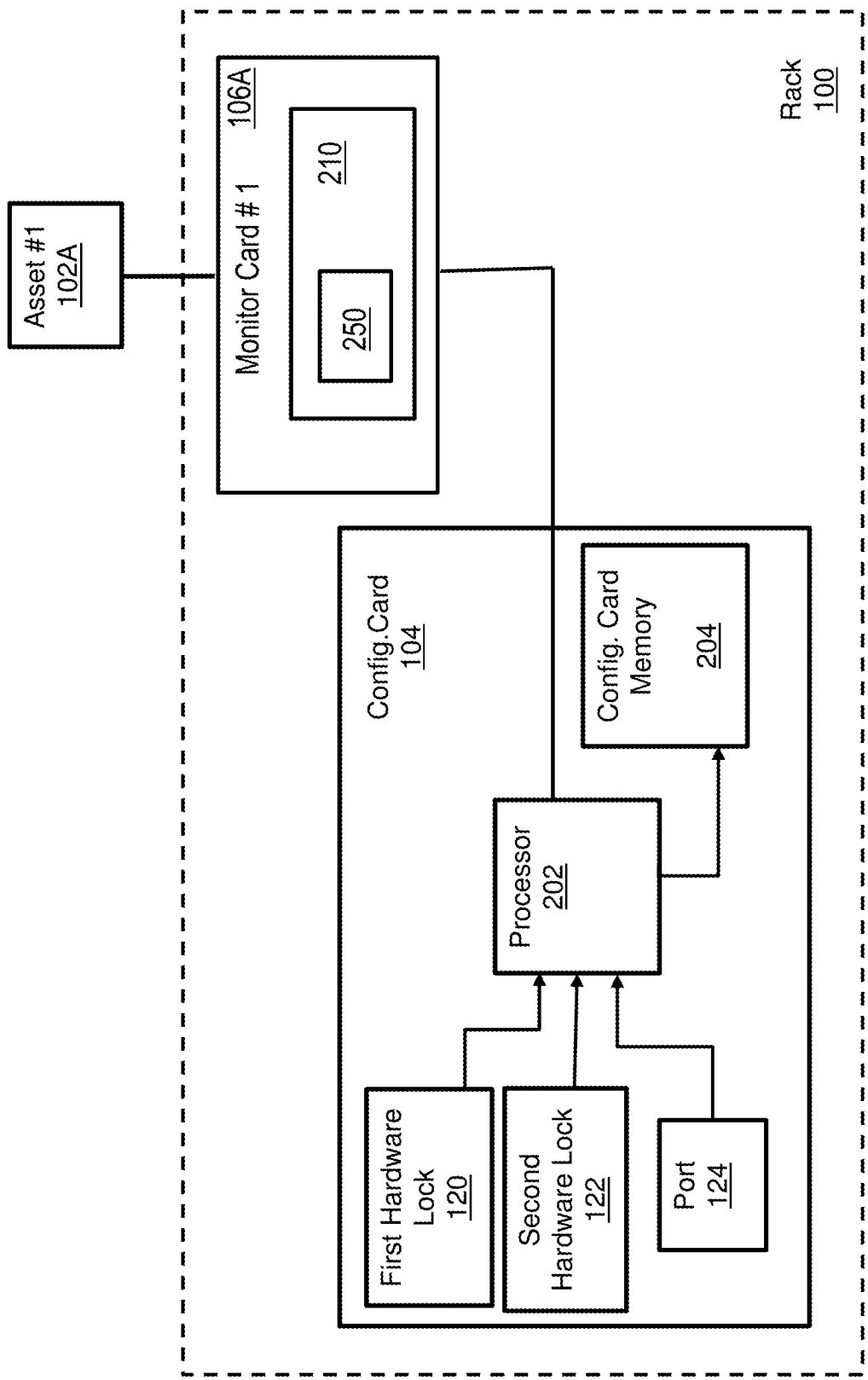
FIG. 2 is a system block diagram of an example configuration card including an example two-step hardware authentication of a machine monitoring system.

FIG. 2 is a system block diagram of an example configuration card 104 in the monitoring system 100. The configuration card 104 can include an example two-step hardware authentication that can improve security of the monitoring system. The configuration card 104 can include a processor 202 that can communicate with the first hardware lock 120, the second hardware lock 122, the data port 124, and a configuration card memory 204. The processor 202 can receive a signal that can include data characterizing the activation of the first hardware lock 120 from the locked state to an unlocked state (e.g., by turning a key in the first hardware lock). The processor 202 can also receive a signal from the second hardware lock that can include data characterizing the first identification indicia of the user. In some implementations, the processor 202 can activate the second hardware lock 122 after receiving data characterizing the activation of the first hardware lock. In another implementation, the second hardware lock 122 can be activated by the first hardware lock 120 after the latter is activated (e.g., first hardware lock 120 can provide an enable signal to second hardware lock 122). In some implementations, the second hardware lock 122 is activated before the first hardware lock 120. For example, the first hardware lock 120 can be activated by the second hardware lock 122 after the latter is activated (e.g., second hardware lock 122 can provide an enable signal to first hardware lock 120). In some implementations, both the first hardware lock 120 and the second hardware lock 122 are enabled such that the they can be unlocked in any order.

Figure 3:
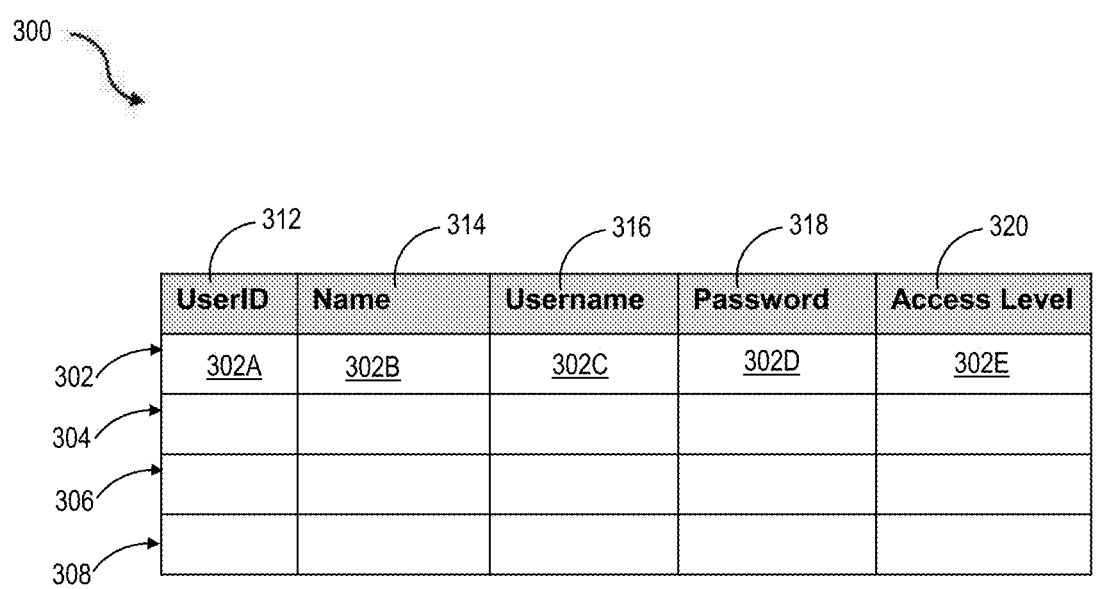
FIG. 3 is an example table of an example database stored in a configuration card memory.

The processor 202 can verify the first identification indicia of the user by comparing it with user identities in a database of authorized users stored in the configuration card memory 204. FIG. 3 is an example table of an exemplary database of authorized users 300. The database 300 can include user data sets 302-308 having verification and access information of various users. A user data set can include values for various data fields, such as UserID 312, name of the users 314, login user names 316, login user passwords 318 and a user access level 320. The processor 202 can retrieve the entire or a portion of the database of authorized users 300 from the configuration card memory 204. For example, the processor can retrieve the UserID data field that includes user identification values of all the user data sets. The processor 202 can verify the detected first identification indicia, for example, by comparing it with the user identification values in the UserID field 312. If a match is found (e.g., the detected first identification indicia matches a UserID value such as 302A of the user data set 302), it can be determined that the first identification indicia is valid.

The processor 202 can activate the data port 124 from a disabled state to an enabled state. This can be done based on verification of the first identification indicia detected by the second hardware lock, activation of the first hardware lock, and/or both. In the enabled state, the data port 124 can operatively couple to the computing device (e.g., laptop, tablet, etc.) of the user. The data port can receive information (e.g., user name, user password, set point value query, and the like) from the computing device, and can provide information (e.g., current or edited set point values of machines).

The processor 202 can receive a second identification indicia of the user from the computing device via the data port 124. The second identification indicia can include a user name and a user password. The processor 202 can verify the user name and the user password of the second identification indicia by comparing them with values in data fields of login user name 316 and a login user password 318. The processor 202 can determine that the second identification indicia is valid when the corresponding user name and the user password (e.g., received from the user via the data port 124) matches the login user name and login password values of the user data set associated with the first identification indicia. For example, if the detected first identification indicia matches the UserID value 302A of the user data set 302, the second identification indicia is considered valid if the received user name and the user password matches the login user name value 302C and the login user password value 302D, respectively.

The processor 202 can determine an access level of the user, which can be indicative of the privileges assigned to the user. The access level can indicate the set point values (e.g., set point values stored in memory cards of machines 106A-N) that the user can access. The access level can indicate one or more database operation (e.g., read, write, and the like) that the user can perform on the accessible set point values. In some implementations, access level information can be stored in the access level data field 320 of the authorized user database. A user data set (e.g., 302), can have the access level information (e.g., 302E) stored in the access level data field 320. In some implementations, the user can be assigned an access level when both the first identification indica and the second identification indicia have been verified. For example, the user can be assigned an access level when he/she provides a valid RFID card to the second hardware lock, enters valid user name via the data port 124 and a valid user password via the data port 124.

The access level data field 320 can include an array of pointers that point to various set point values of the machines. For example, a pointer can point to set point value 250 in monitor card memory 210 of the monitor card 106A. The access level data field 320 can include one or more database operations (e.g., read/edit set point value 250) that an authorized user can perform on a set point value accessible to the user.

The processor 202 can also receive a user input for an alarm set point value (e.g., set point value 250 in monitor card memory 210 of the monitor card 106A). In some implementations, the processor 202 can prompt the user to provide a user input. The processor 202 can determine the validity of the user input. This can be performed if the access level of the user permits the user input. For example, if the user input includes a request for database operation on set point value 250, the processor can determine if access level information associated with the user includes a pointer for the set point value 250. If it is determined that the user input provided by the user is valid, the processor 202 can execute the database operation on the set point value (e.g., set point value 250). If it is determined that the user input provided by the user is invalid, the processor 202 may not execute the database operation, and the set point value remains unchanged.

The monitor card 106A can communicate with the machine 102A. For example, the monitor card 106A can receive operating parameters from the machine 102A (e.g., from sensors associated with the machine 102A). The monitor card 106A can also generate an alarm when a machine operating parameter exceeds a set point value. In some implementations, the monitor card can shut the machine down when the operating parameter exceeds a critical set point value.

Figure 4:
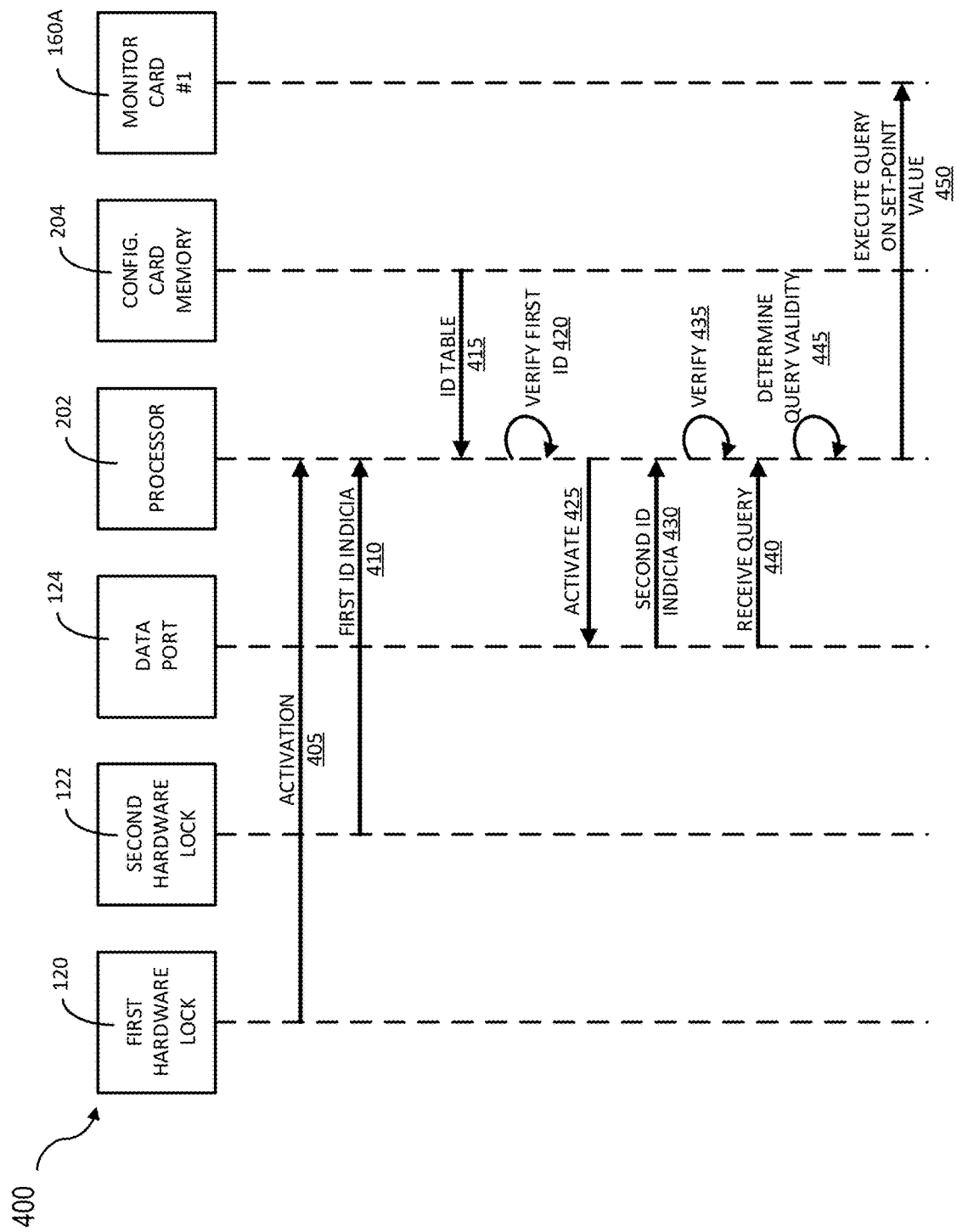
FIG. 4 is a data flow diagram of an exemplary process of a two-step hardware authentication of a machine monitoring system.

FIG. 4 is a data flow diagram of an exemplary process of a two-step hardware authentication of an example machine monitoring system. At 405, the processor 202 can receive data characterizing the activation of the first hardware lock 120. The activation data can be indicative, for example, that the first hardware lock has been activated from a locked-state to an unlocked-state by a key.

At 410, the processor 202 can receive data characterizing the first identification indicia from the second hardware lock. This data can include data received and/or detected by the second hardware lock 122 (e.g., via RFID, Bluetooth, keypad, and the like). In some implementations, the second hardware lock can include a sensor to detect a unique RFID card assigned to the user. In some implementations, the second hardware lock can include a keypad through which the user can enter a unique code associated with the user. Based on the first identification indicia (e.g., RFID detection, access code entry, and the like), the second hardware lock can generate a signal that includes data characterizing the first identification indicia.

At 415, the processor 202 can retrieve the entire or a portion of the authorized database table (e.g., database table 300) from the configuration card memory 204. In some implementations, processor 202 can selectively retrieve a data field (e.g. user identification data field 312) from the database of authorized user (e.g., database 300). In some implementations, the processor 202 can selectively retrieve information about a particular user (e.g., the processor 202 can retrieve values from the user data set 302).

At 420, the processor 202 can verify the first identification indicia. This can be done, for example, by comparing the first identification indicia (e.g., received at 410) with data from the database of authorized users (e.g., retrieved by the processor 202 at 415).

At 425, the processor 202 can activate the data port 124 from a disabled state to an enabled state (e.g., based on verification process at step 420 and/or activation of first hardware lock at step 405). In the enabled state, the data port 124 can operatively couple to a computing device of the user.

At 430, the processor 202 can receive the second identification indicia from the user device. The second identification indicia can include a user name and a user password. In some implementations, the processor 202 can prompt the computing device of the user to provide the user name and the user password. The processor 202 can save information related to the second identification (e.g., time of receiving the second identification) in the configuration card memory.

At 435, the second identification indicia can be verified by the processor 202. For example, the user name and the user password in the second identification indicia can be validated by comparing them with login user names and login user passwords in the authorized database table.

At 440, the processor can receive a user input from the computing device of the user via the data port 124. In some implementations, the processor 202 can prompt the computing device of the user to provide an input (e.g., query) for one or more alarm set points value. The user input can identify the set point values on which the user desires to perform a database operation. The user input can also identify the type of database operation and/or replacement values for set point values.

At 445, the processor 202 can determine the validity of the user input. This can be done, for example, by determining the access level authorized to the user (e.g., based on access level data in authorized user database), and by determining if the access level of the user permits the user input.

At 450, the processor 202 can execute the user input on a set point values in the memory of a monitor card of a machine. For example, if the database operation is an edit operation, the processor 202 can edit the set point value (e.g., set point value 250) and then save the edited set point value it in the monitor card memory (e.g., monitor card memory 210).

Figure 5:
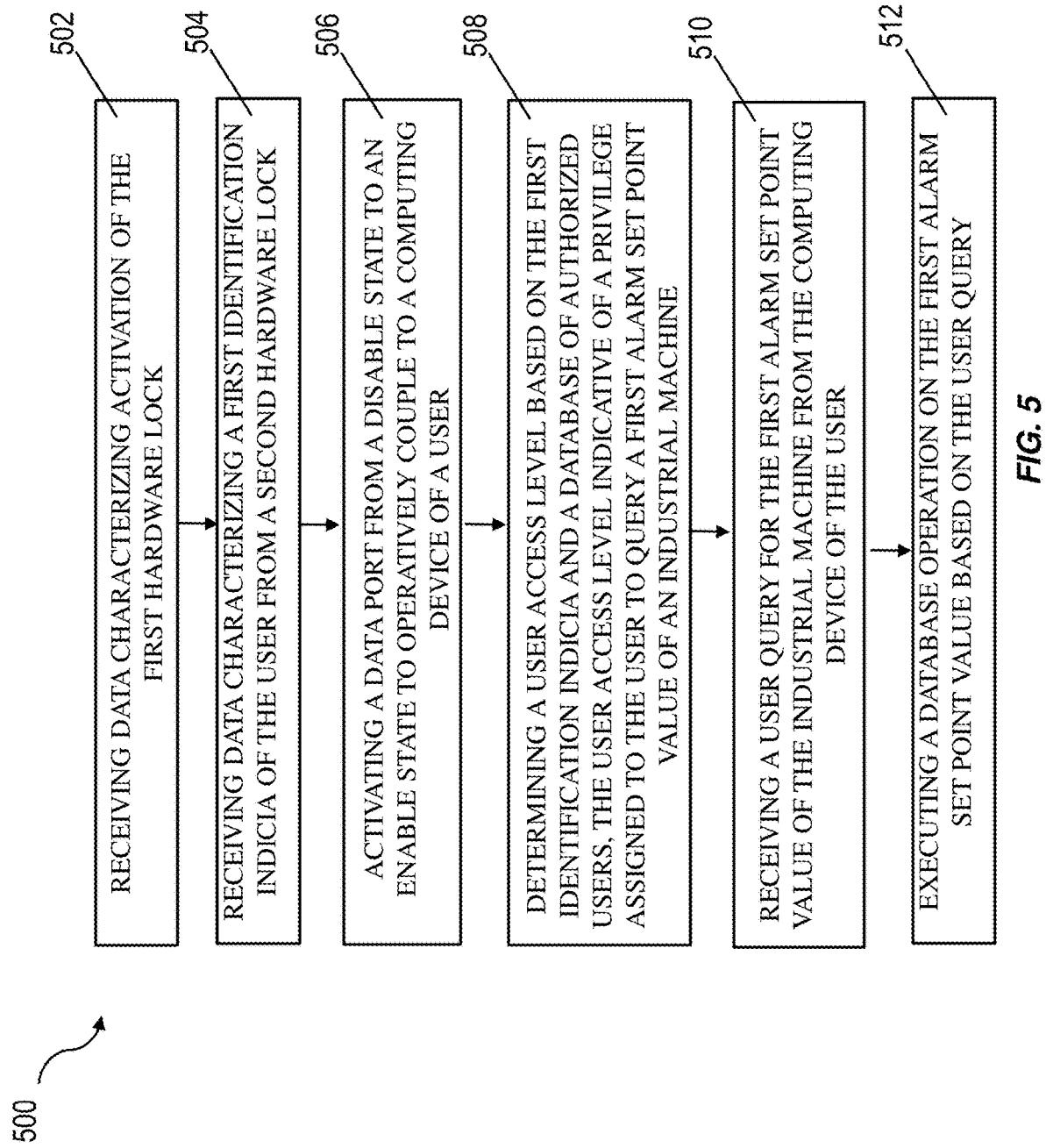
FIG. 5 is a process flow diagram illustrating an exemplary method for two-step hardware authentication by a processor.

FIG. 5 is a process flow diagram illustrating an exemplary method for two-step hardware authentication that can improve security for machine monitoring system that can be executed by the processor 202. At 502, data characterizing the activation of the first hardware lock is received by the processor 202. The activation data can be indicative, for example, that the first hardware lock has been activated from a locked-state to an unlocked-state by a key.

At 504, data characterizing a first identification indicia of the user can be received from a second hardware lock. In some implementations, the second hardware lock can include a sensor to detect a unique RFID card assigned to the user. In some implementations, the second hardware lock can include a keypad through which the user can enter a unique code associated with the user. Based on the first identification indicia (e.g., RFID detection, access code entry, and the like), the second hardware lock can generate a signal that includes data characterizing the first identification indicia.

At 506, the data port 124 can be activated from a disable state to an enable state enabling the port to operatively couple to a computing device of a user. In some implementations, the processor 202 can activate the data port 124 when the processor 202 can confirm that one or both of the first hardware lock and second hardware lock have been activated. The determining can be, for example, based on data received at steps 502 and 504.

At 508, a user access level can be determined based on the first identification indicia and a database of authorized users. The user access level can be indicative of a privilege assigned to the user to access (e.g., query) a first alarm set point value of a machine (e.g., industrial machine). The user access level can be determined when the first identification indicia received by the processor (e.g., at step 504) matches a user identity value in the database of authorized users. Determination of the access level can also depend on the validity of a second identification indicia provided by a computing device of the user via the data port 124. In some implementations, both the first identification indicia and the second identification indicia need to be valid for the determination of the user access level.

At 510, a user input for the first alarm set point value of the machine can be received from the computing device of the user. The user input can be received from the computing device of the user via the data port 124. In some implementations, the processor can prompt the computing device of the user to provide the user input. The user input can include information of one or more set point values associated with the user input. The user input can also include the database operations to be performed on the one or more set point values.

At 512, a database operation can be executed on the first alarm set point value based on the user input. This can be done, for example, by requesting the first alarm set point value (e.g., set point value 250) from a monitor card memory (e.g., memory 210) of a monitor card (e.g., 106A). If the database operation is a read operation, the processor can provide the first alarm set point value to the user (e.g., display the first alarm set point value on the computing device of the user). If the database operation is an edit operation, the processor 202 can edit the first alarm set point value and then save the edited first alarm set point value it in the monitor card memory (e.g., memory 210). In some implementations, the user can provide a replacement value for the first alarm set point in the user query or raise or lower the first alarm by a set amount. The processor can access the first alarm set point value using an edit privilege and replace the first alarm set point value with the replacement value. The processor 202 can indicate to the user (e.g., by a message on the user computing device) that the data operation of the user input has been executed.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another.

Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A system comprising:
   a first hardware lock having a locked-state and an unlocked-state, the first hardware lock configured to be activated from the locked-state to the unlocked-state by a key;
   a second hardware lock including a sensor configured to detect a first identification indicia of a user;
   a data port configured to operatively couple to a computing device of the user, the data port having an enable state and a disable state; and
   a processor operatively coupled to the first hardware lock, the second hardware lock, and the data port, wherein the processor is configured to:
   receive data characterizing the activation of the first hardware lock;
   receive data characterizing the first identification indicia of the user detected by the sensor in the second hardware lock;
   activate the data port from the disable state to the enable state to operatively couple to the computing device of the user based on data characterizing the activation of the first hardware lock and based on verification of the data characterizing the first identification indicia of the user detected by the sensor in the second hardware lock;
   determine a user access level based on the first identification indicia and a database of authorized users, the user access level indicative of a privilege assigned to the user to access a first alarm set point value of a machine; and
   receive a user input for the first alarm set point value of the machine from the computing device of the user.

2. The system of claim 1, further comprising:
   a monitor card associated with the machine, the monitor card including a monitor card memory that stores the first alarm set point value; and
   a configuration card including the first hardware lock, the second hardware lock, the data port, the processor and a configuration card memory, wherein the configuration card memory stores the database of authorized users,
   wherein the processor is operatively coupled to the monitor card and configured to execute a database operation on the first alarm set point value based on the user input.

3. The system of claim 1, wherein verification of the first identification indicia includes identifying a user identification value indicative of the first identification indicia in the database of authorized users.

4. The system of claim 3, wherein the processor is further configured to receive a second identification indicia of the user from the computing device via the data port.

5. The system of claim 4, wherein the processor is further configured to verify the second identification indicia of the user based on a user name value and a user password value associated with the user identification value in the database of authorized users.

6. The system of claim 5, wherein the processor is configured to determine the user access level based on the user identification value, the user name value and the user password value.

7. The system of claim 6, wherein the user access level is indicative of an authorized database operation associated with the user, the authorized database operation including one of reading the first alarm set point value and/or editing the first alarm set point value in a monitor card memory of the machine.

8. The system of claim 6, wherein the processor is further configured to execute the user input based on the determined access level.

9. The system of claim 6, wherein the user identification value, the username value, the user password value and information associated with the user access level are stored in a user dataset in the database of authorized users.

10. The system of claim 9, wherein the information associated with the user access level includes indicia of one or more set point values accessible to the user, and one or more authorized database operations associated with each of the one or more set point values.

11. The system of claim 1, wherein the sensor in the second hardware lock is configured to detect the first identification indicia via one or more of RFID, Bluetooth, and keypad.

12. A method comprising:
   receiving data characterizing activation of a first hardware lock;
   receiving data characterizing a first identification indicia of the user detected by a sensor in a second hardware lock;
   activating a data port from a disable state to an enable state to operatively couple to a computing device of a user based on data characterizing the activation of the first hardware lock and based on verification of the data characterizing the first identification indicia of the user detected by the sensor in the second hardware lock;
   determining a user access level based on the first identification indicia and a database of authorized users, the user access level indicative of a privilege assigned to the user to access a first alarm set point value of an machine;
   receiving a user input for the first alarm set point value of the machine from the computing device of the user; and
   executing a database operation on the first alarm set point value based on the user input.

13. The method of claim 12, wherein verifying the first identification indicia includes identifying a user identification value indicative of the first identification indicia in the database of authorized users.

14. The method of claim 13, further comprising receiving a second identification indicia of the user from the computing device via the data port.

15. The method of claim 14, further comprising verifying the second identification indicia of the user based on a user name value and a user password value associated with the user identification value.

16. The method of claim 15, wherein determining the user access level is based on the user identification value, the user name value and the user password value.

17. The method of claim 16, wherein the user access level is indicative of an authorized database operation associated with the user, the authorized database operation including one of reading the first alarm set point value and/or editing the first alarm set point value.

18. The method of claim 12, wherein executing the database operation on the first alarm set point includes editing the first alarm set point value to a new value based on the user input.

\* \* \* \* \*